United States Patent
Kirkpatrick

(10) Patent No.: US 9,628,629 B1
(45) Date of Patent: Apr. 18, 2017

(54) PROVIDING CONFERENCE CALL AID BASED ON UPCOMING DEADLINE

(71) Applicant: MICROSOFT TECHNOLOGY LICENSING, LLC, Redmond, WA (US)

(72) Inventor: Ben Kirkpatrick, Campbell, CA (US)

(73) Assignee: MICROSOFT TECHNOLOGY LICENSING, LLC, Redmond, VA (US)

( * ) Notice: Subject to any disclaimer, the term of this patent is extended or adjusted under 35 U.S.C. 154(b) by 0 days.

(21) Appl. No.: 14/960,458

(22) Filed: Dec. 7, 2015

(51) Int. Cl.
*H04M 3/42* (2006.01)
*H04M 1/00* (2006.01)
(Continued)

(52) U.S. Cl.
CPC .......... *H04M 3/56* (2013.01); *G06Q 10/1095* (2013.01); *H04M 3/565* (2013.01);
(Continued)

(58) Field of Classification Search
CPC ....... H04M 1/274575; H04M 1/72586; H04M 2203/60; H04M 2203/2072; H04M 2203/2094; H04M 2203/5054; H04M 2242/30; H04M 2250/62; H04M 3/42; H04M 3/4234; H04M 3/42221; H04M 3/42246; H04M 3/42348; H04M 3/42357; H04M 3/42374; H04M 3/4931; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04M 7/1235; H04L 12/18; H04L 12/1813; H04L 12/581; H04L 47/78; H04L 47/80; H04L 51/04; H04L 63/10; H04L 63/104; H04L 63/107; H04L 65/1053; H04L 65/403; H04L 67/18;
(Continued)

(56) References Cited

U.S. PATENT DOCUMENTS

| 8,204,196 B2 * | 6/2012 | O'Sullivan | H04M 3/56 370/260 |
| 8,250,141 B2 * | 8/2012 | Xiao | G06Q 10/10 709/204 |

(Continued)

OTHER PUBLICATIONS

"Scheduling Assistant", Published on: Apr. 7, 2013 Available at: https://www.uwec.edu/help/email/MicrosoftOutlookSchedulingAssistant.htm.
"Cisco WebEx Meeting Center Getting Started", Published on: Oct. 24, 2014 Available at: http://www.webex.com/content/dam/webex/eopi/Americas/USA/en_us/documents/pdf/MC/pdf-MC-Getting-Started-Win-GTG-EN.pdf.
(Continued)

*Primary Examiner* — Khai N Nguyen
(74) *Attorney, Agent, or Firm* — Turk IP Law, LLC

(57) ABSTRACT

Providing a conference call aid based on an upcoming deadline may be provided. In some examples, an application, such as a task management application, detects an expiration of a join duration from a start time of a meeting. In response to the expiration, a late invitee to the meeting is identified. Next, a communication modality to communicate with the late invitee is identified. Furthermore, a communication with the late invitee is established based on the communication modality. A notification to join the meeting is transmitted to the late invitee. The late invitee is notified to join the meeting through the communication.

20 Claims, 7 Drawing Sheets

(51) Int. Cl.
*H04M 11/00* (2006.01)
*H04L 12/16* (2006.01)
*H04Q 11/00* (2006.01)
*H04N 7/14* (2006.01)
*H04M 3/56* (2006.01)
*G06Q 10/10* (2012.01)

(52) U.S. Cl.
CPC .... *H04M 3/567* (2013.01); *H04M 2203/5009* (2013.01); *H04M 2203/5081* (2013.01)

(58) Field of Classification Search
CPC ........ H04L 67/24; H04W 12/08; H04W 4/02; H04W 4/06; H04W 4/08
USPC .............. 379/90.01, 93.01, 93.21, 157, 158, 379/201.01, 202.01, 207.01, 265.03; 370/259, 260, 261, 262; 455/411, 414.1, 455/416, 566; 709/225; 348/14.01, 348/14.02, 14.03, 14.04, 14.05, 14.06, 348/14.07, 14.08, 14.09, 14.1, 14.11, 348/14.12, 14.13, 14.14, 15.15, 14.16; 382/275; 704/270
See application file for complete search history.

(56) References Cited

U.S. PATENT DOCUMENTS

| | | | |
|---|---|---|---|
| 8,494,141 | B2 | 7/2013 | Jenkins et al. |
| 8,594,291 | B2 | 11/2013 | Bieselin et al. |
| 8,917,847 | B2 | 12/2014 | Mai et al. |
| 2009/0323916 | A1* | 12/2009 | O'Sullivan ............ H04M 3/56 379/202.01 |
| 2010/0324963 | A1 | 12/2010 | Gupta et al. |
| 2012/0246229 | A1* | 9/2012 | Carr .................... H04L 12/1818 709/204 |
| 2015/0006217 | A1 | 1/2015 | Buehl et al. |
| 2015/0074189 | A1* | 3/2015 | Cox .................... H04L 12/1822 709/204 |
| 2015/0088572 | A1* | 3/2015 | Mai .................... G06Q 10/1093 705/7.18 |
| 2015/0112748 | A1* | 4/2015 | Kaye ..................... H04M 3/56 705/7.19 |

OTHER PUBLICATIONS

Hossain, et al., "A Deliberative Agent for Meeting Scheduling", In Proceedings of IEEE 27th International Conference on Advanced, Mar. 25, 2013, pp. 732-739.

* cited by examiner

PROVIDING CONFERENCE CALL AID BASED ON UPCOMING DEADLINE

BACKGROUND

Conference calls allow people or parties to participate in a single conversation. The conference calls may couple several locations with use of a communication channel. At each location, there may be several people or parties to the conversation. Each location may include, for example, a conventional telephone set used by a single party or a conventional speakerphone used by the parties. The communication channel supporting the conference call may include a conventional switched telephone network or a wireless communication link, for example. Conference calls, however, fail to identify late participating parties during the telephone conference calls.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a conference call aid based on an upcoming deadline. In some examples, an application, such as a task management application, may detect an expiration of a join duration from a start time of a meeting. In response, a late invitee to the meeting may be identified. The task management application may detect a communication modality to communicate with the late invitee and may establish a communication with the late invitee based on the communication modality. A notification to join the meeting may be transmitted to the late invitee. The notification may prompt the late invitee to join the meeting through the communication.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
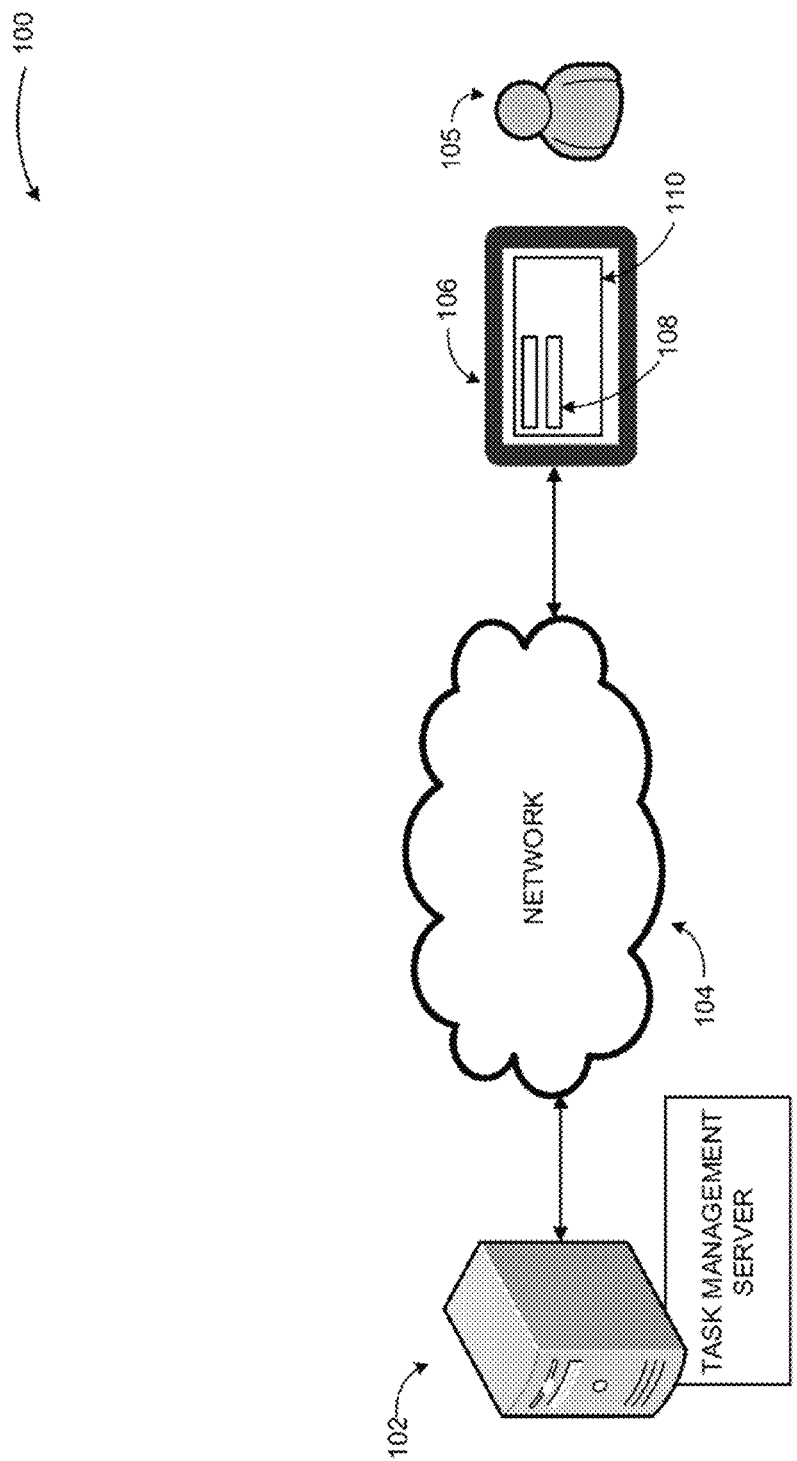
FIG. 1 is a conceptual diagram illustrating a method for providing conference call aid based on upcoming deadlines, according to embodiments.

As briefly described above, providing a conference call aid based on an upcoming deadline may be provided. In some examples, an application, such as a task management application, may detect an expiration of a join duration from a start time of a meeting. In response to the expiration, a late invitee to the meeting may be identified. The late invitee may be a person who is absent from the meeting.

Next, a communication modality to communicate with the late invitee may be detected. The communication modality may be identified from a communication type associated with the late invitee. A communication with the late invitee may be established based on the communication modality. Furthermore, a notification to join the meeting may be transmitted to the late invitee. The notification may prompt the late invitee to join the meeting through the communication.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing a conference call aid based on an upcoming deadline. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using communications herein, embodiments are not limited to communications. Providing a conference call aid based on an upcoming deadline may be implemented in other environments, such as instant messages, data sharing, application sharing, and similar communications, where communication data may be exchanged.

The technical advantages of providing the conference call aid based on the upcoming deadline may include, among others, an increased efficiency in automation of invitee management in relation to late invitees and automated facilitation of attendance by the late invitees. Processing and network bandwidth usage may also be reduced by avoiding repeated notifications to the late invitee. Transmission of the notification to the late invitee to join the meeting may result in a reduced memory and processor burden.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with the communications.

FIG. 1 is a conceptual diagram illustrating a method for providing conference call aid based on upcoming deadlines, according to embodiments.

As shown in a diagram 100, a computing device 106 may execute a task management application 108. The computing device 106 may be a special purpose device that automates conference call connections to a meeting for invitees who are late to the meeting. The computing device 106 may include components such as processor(s), a networking device, and/or a storage device, among others. The networking device may be used to communicate with other device(s). Furthermore, the computing device 106 may include a desktop computer, a laptop computer, a tablet, a smart phone, and a wearable computer, among other similar computing devices, for example.

In some examples, the task management application 108 may be executed on a task management server 102. The task management server 102 may include a web server, a project management server, and/or a document server, among others. The computing device 106 may communicate with the task management server 102 through a network 104. The network 104 may provide wired or wireless communications between nodes, such as the computing device 106 or the task management server 102.

The task management application 108 may detect an expiration of a join duration from a start time of a meeting and may identify a late invitee to the meeting. In some examples, the meeting invitee 105 may be the late invitee. The task management application 108 may detect a communication modality to communicate with the late invitee and may establish a communication with the late invitee based on the communication modality. The task management application 108 may transmit, through the networking device, a notification to join the meeting to the late invitee. The notification may prompt the late invitee to join the meeting through the communication.

While the example system in FIG. 1 has been described with specific components such as the task management server 102 and similar devices, embodiments are not limited to these components or system configurations and can be implemented with other system configuration employing fewer or additional components. Functionality for systems providing a conference call aid based on an upcoming deadline may also be distributed among the components of the systems differently depending on component capabilities and system configurations. Furthermore, embodiments are not limited to the approaches discussed herein, as the approaches may be applied to any data exchange in a networked communication environment using the principles described herein.

Figure 2:
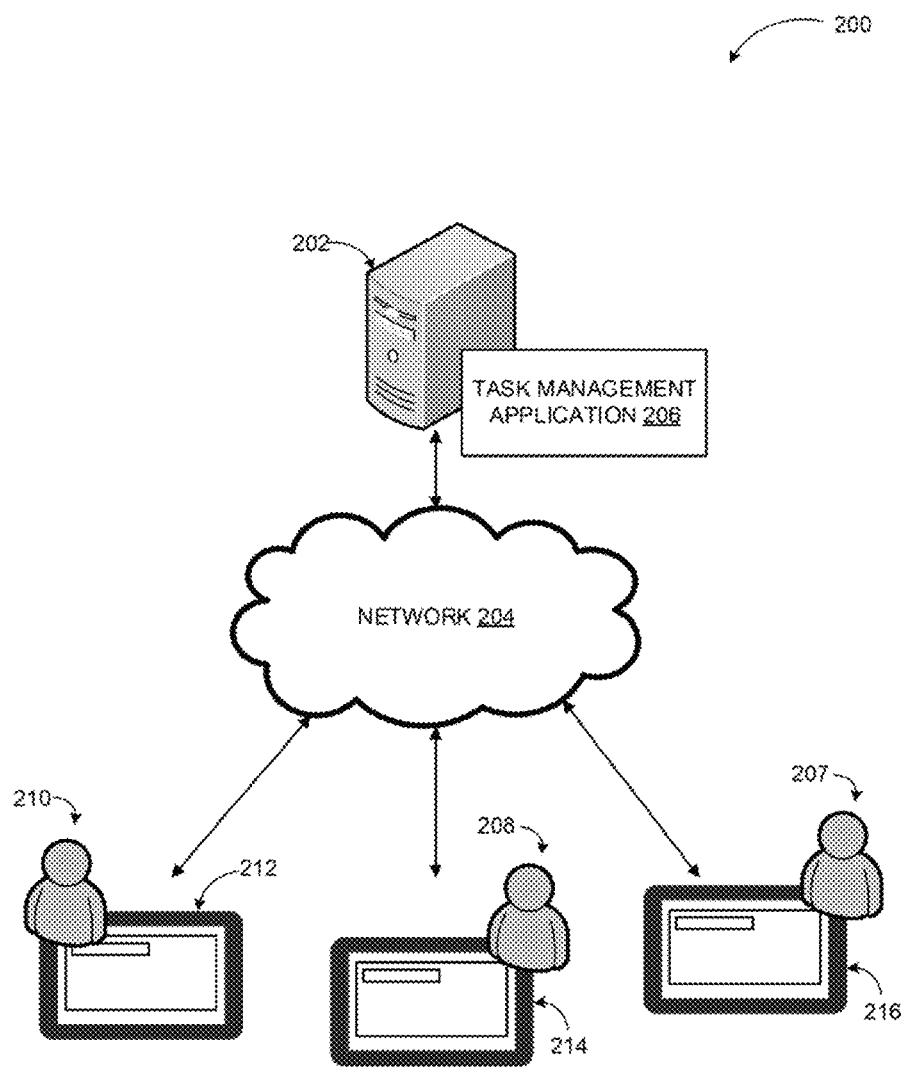
FIG. 2 is a conceptual diagram illustrating components of a scheme for providing conference call aid based on upcoming deadlines, according to embodiments.

FIG. 2 is a conceptual diagram illustrating components of a scheme for providing conference call aid based on upcoming deadlines, according to embodiments.

In a diagram 200, a task management application 206 may be executed on a task management server 202. The task management server 206 may include a web server, a project management server and/or a document server, among others. Computing devices (212, 214, and 216) may communicate with the task management server 202 through a network 204. Meeting invitees (210, 208, and 207) may interact with the computing devices (212, 214, and 216). Furthermore, the network 204 may provide wired or wireless communications between nodes, such as the computing devices (212, 214, and 216) and the task management server 202. In other examples, the task management application 206 may be provided by a third party service, a web application, and/or a datacenter, among others. Local access to the task management application 206 may be provided by locally installed rich clients (a local version of the task management application 206) or generic applications.

In some embodiments, the task management application 206 may detect an expiration of a join duration from a start time of a meeting and may identify a late invitee (e.g., the meeting invitee 210) to the meeting. The task management application 206 may identify a supervisory role associated with the late invitee (e.g., the meeting invitee 210) and may generate a lock on the meeting to prevent a sharing of files and slides between meeting attendees (e.g., the meeting invitee 208 and/or the meeting invitee 207). The task management application 206 may also detect the late invitee (e.g., the meeting invitee 210) joining the meeting and may release the lock from the meeting.

In further embodiments, the task management application 206 may identify the meeting categorized as optional and may detect a request to categorize the meeting as mandatory. The task management application 206 may modify the meeting from optional to mandatory. In other embodiments, the task management application 206 may detect a failure to attend the meeting by the late invitee (e.g., the meeting invitee 210) after the expiration of an extended join duration. The task management application 206 may cancel the meeting.

Figure 3:
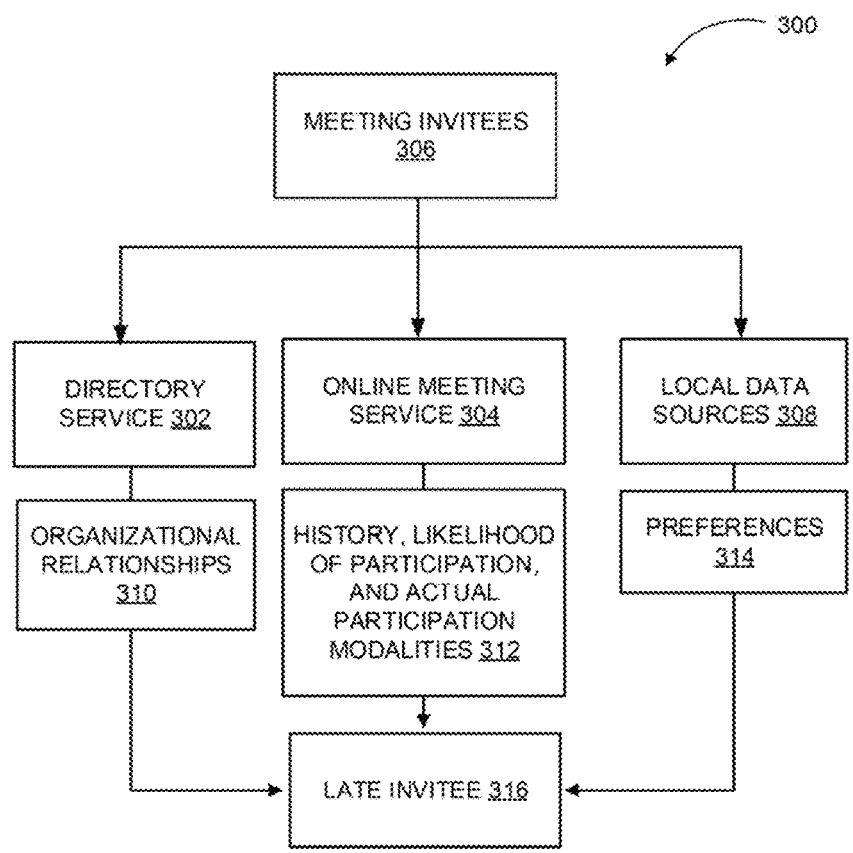
FIG. 3 is a block diagram illustrating example interactions between components of a system to identify a late invitee, according to embodiments.

FIG. 3 is a block diagram illustrating example interactions between components of a system to identify a late invitee according to embodiments.

In a block diagram 300, a special purpose computing device may execute a task management application to automate tracking late invitees and connecting the late invitees to a meeting. The task management application may identify meeting invitees 306 during an initialization of the meeting. The task management application may identify meeting attendees as the meeting invitees 306 having an active status associated with the communication modality. The task management application may display status information associated with the meeting attendees and a late invitee 316. The task management application may distinguish the meeting attendees from the late invitee 316 using a textual scheme, a graphical scheme, an audio scheme, an animation scheme, a coloring scheme, a highlighting scheme, and/or a shading scheme, among others.

In some embodiments, the task management application may utilize a directory service 302 to identify attributes associated with the meeting invitees 306. The attributes may include an organizational relationship 310. In other examples, the task management application may utilize an online meeting service 304 to identify additional attributes associated with the meeting invitees 306. The additional attributes may include a participation history 312.

In other examples, the task management application may provide the attributes on a task management user interface (UI). The attributes may be listed in status columns hierarchically distinguished from the sub-attributes in the same column. The sub-attributes may include summary views of the attributes. An automatic mapping may be performed to translate the attribute fields to the status columns.

In other examples, the task management application may apply a filter during the process to map the attributes to the columns. The filter may include rules. An example of a rule may include "place attributes related to the participation history in the first column." A scheme may evaluate each of the attributes to detect the column the attributes fit in based on the filter (rule or combination of rules). In response to the evaluation of the attributes, the task management application may move the attributes to the respective column. The fields and values associated with the attributes may be displayed visually on the task management UI. In some examples, the attributes may be displayed using graphical objects and/or textual identification. Some or all of displayed elements on the task management interface may be actionable.

In further examples, the task management application may utilize local data sources 308 and/or social networking sources to identify preferences 314 associated with the meeting. The preferences 314 may include a behavioral relationship between the meeting invitees 306 and a meeting presenter. The behavioral relationship may include a frequency of previous communications between the meeting invitees 306 and the meeting presenter, a timing of the previous communications, a subject matter discussed during the previous communications, and/or the modality of the previous communications, among others. In some embodiments, the behavioral relationship may include a status of the communication modality. The communication modality may include a text messaging session, an audio communication session, a video communication session, and a data sharing session, among others.

The task management application may determine a participation likelihood of the meeting invitees 306 based on the organizational relationships 310, the participation history 312, and/or the preferences 314, among other factors. The task management application may identify a late invitee 316 based on the participation likelihood.

In further examples, the task management application may detect the communication modality to communicate with the late invitee 316. The task management application may determine the participation likelihood of the meeting invitees 306 based on the status of the communication modality. The task management application may identify the late invitee 316 from the meeting invitees 306 based on the participation likelihood. The status of the communication modality may include a muting status of a microphone, a muting status of a speaker, an on status of a camera, a movement detected in front of the camera, an action to share a presentation, a detected use of a telepointer, and/or an annotation on a whiteboard associated with the late invitee 316, among others.

In other embodiments, the task management application may utilize the local data sources 308 and/or the social networking sources to identify the preferences 314 of the meeting. The preferences 314 may also include a display capability, local endpoint resources (e.g., processors, memory, display drivers, graphics acceleration, etc.), and/or location of the meeting invitees, among others. The preferences 314 may be retrieved from the local data sources 308, such as installed applications and/or data files on the computing device.

Figure 4:
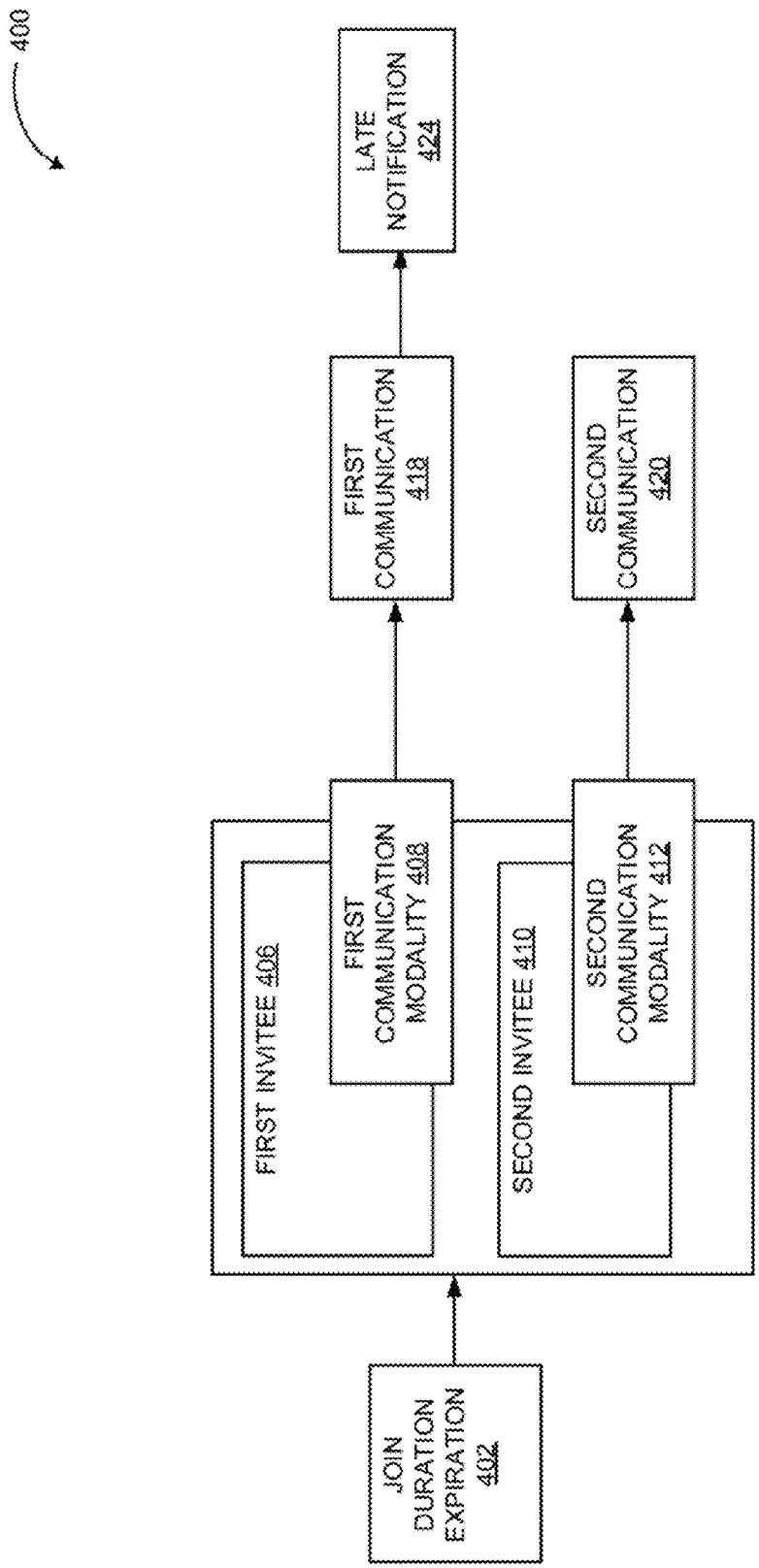
FIG. 4 is a conceptual diagram of a process for providing conference call aid based on upcoming deadlines, according to embodiments.

FIG. 4 is a conceptual diagram of a process for providing conference call aid based on upcoming deadlines according to embodiments.

In a conceptual diagram 400, a computing device may execute a task management application. The computing device may provide the task management application to a meeting invitee 406 and/or another meeting invitee 410, among others. The task management application may include a meeting monitoring engine and/or a communication engine, among others.

The meeting monitoring engine of the task management application may detect an expiration 402 of a join duration from a start time of a meeting. In some examples, the meeting monitoring engine may initiate a countdown of the join duration at the start time of the meeting. In response to the detection of the expiration 402, the meeting monitoring engine may identify a late invitee to the meeting (e.g., the meeting invitee 406). The meeting monitoring engine may detect a communication modality 408 associated with the meeting invitee 406 and/or another communication modality 412 associated with the other meeting invitee 410, among others. The meeting monitoring engine may use the communication modality 408 to communicate with the late invitee (e.g., the meeting invitee 406).

The communication engine of the task management application may establish a communication 418 with the late invitee (e.g., the meeting invitee 406) based on the communication modality 408. In other embodiments, the communication engine may establish another communication 420 with the other meeting invitee 410 based on the other communication modality 412.

The communication engine may transmit a notification 424 to join the meeting to the late invitee (e.g., the meeting invitee 406). The notification 424 may prompt the late invitee (e.g., the meeting invitee 406) to join the meeting through the communication 418. In other embodiments, the meeting monitoring engine may determine a status associated with the communication modality 408, for example. In response to a detection of the status as inactive, the meeting monitoring engine may notify a meeting presenter of the late invitee (e.g., the meeting invitee 406).

In further embodiments, the meeting monitoring engine may also verify a status of the other communication modality 412 as active. The meeting monitoring engine may identify meeting invitees (e.g., the other meeting invitee 410) with an active communication (e.g., the other communication 420) associated with the meeting as meeting attendees.

In some embodiments, the communication engine may detect an optional categorization of the meeting and may disconnect the communication 418 with the late invitee (e.g., the meeting invitee 406) based on the optional categorization. In other embodiments, the communication engine may identify a mandatory attendee status associated with the late invitee (e.g., the meeting invitee 406). The communication engine may detect a failure to attend the meeting by the late invitee (e.g., the meeting invitee 406) after the expiration 402 of an extended join duration and may cancel the meeting.

The example scenarios and schemas in FIG. 1 through FIG. 4 are shown with specific components, data types, and configurations. Embodiments are not limited to systems according to these example configurations. Providing a conference call aid based on an upcoming deadline may be implemented in configurations employing fewer or additional components in applications and user interfaces. Furthermore, the example schema and components shown in FIG. 1 through FIG. 4 and their subcomponents may be implemented in a similar manner with other values using the principles described herein.

Figure 5:
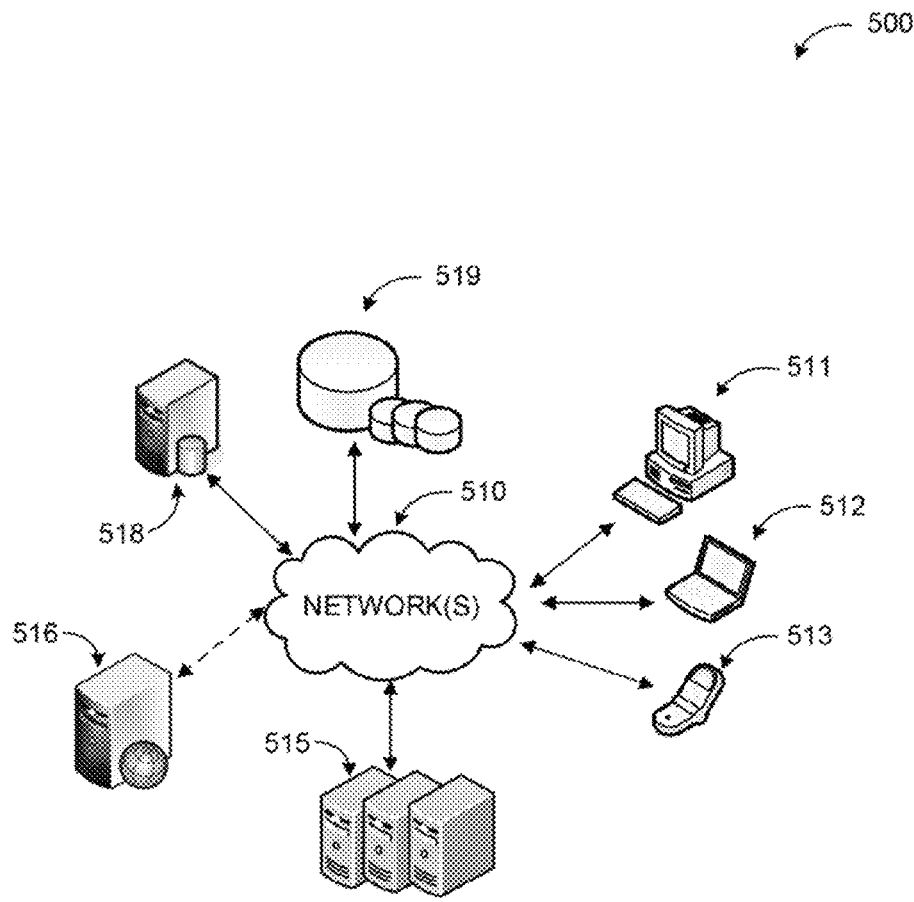
FIG. 5 is a networked environment, where a system according to embodiments may be implemented.

FIG. 5 is a simplified networked environment, where a system according to embodiments may be implemented.

As shown in a diagram 500, a computing device may execute a task management application. In examples, a task management service may be implemented via software executed over the servers 514. The platform may communicate with client applications on individual computing devices such as a smart phone 513, a mobile computer 512, or desktop computer 511 ('client devices') through network(s) 510. The servers 514 may include one or more task management servers 516, where at least one of the one or more task management servers 516 may be configured to execute one or more applications (i.e. the task management application) associated with the task management service.

In other examples, the task management service may be provided by a third party service or may include a web application. The task management service may store data associated with communications in a data store 519 directly or through a database server 518. Client applications executed on client devices 511-513 may be enabled to receive a communication based on the communication modality and receive a notification to join the meeting. The client applications executed on the client devices 511-513 may also be enabled to receive the communication data and render a task management interface displaying information associated with communication.

Client applications executed on any of the client devices 511-513 may facilitate communications via application(s) executed by the one or more task management servers 516, or on an individual task management server. An application, such as a task management application, may detect an expiration of a join duration from a start time of a meeting and may identify a late invitee to the meeting. The task management application may detect a communication modality to communicate with the late invitee and may establish a communication with the late invitee based on the communication modality. A notification to join the meeting may be transmitted to the late invitee. The notification may prompt the late invitee to join the meeting through the communication. The task management application may store the communication data associated with the communication in the data store 519 directly or through database server 518.

The network(s) 510 may comprise any topology of servers, clients, Internet service providers, and communication media. A system according to embodiments may have a static or dynamic topology. The network(s) 510 may include secure networks such as an enterprise network, an unsecure network such as a wireless open network, or the Internet. The network(s) 510 may also coordinate communication over other networks such as Public Switched Telephone Network (PSTN) or cellular networks. Furthermore, the network(s) 510 may include short range wireless networks such as Bluetooth or similar ones. The network(s) 510 provide communication between the nodes described herein. By way of example, and not limitation, the network(s) 510 may include wireless media such as acoustic, RF, infrared and other wireless media.

A textual scheme, a graphical scheme, an audio scheme, an animation scheme, a coloring scheme, a highlighting scheme, and/or a shading scheme may be employed to further enhance participant interaction between information associated with the communication and the task management interface.

Many other configurations of computing devices, applications, data sources, and data distribution systems may be employed for providing a conference call aid based on an upcoming deadline. Furthermore, the networked environments discussed in FIG. 5 are for illustration purposes only. Embodiments are not limited to the example applications, modules, or processes.

Figure 6:
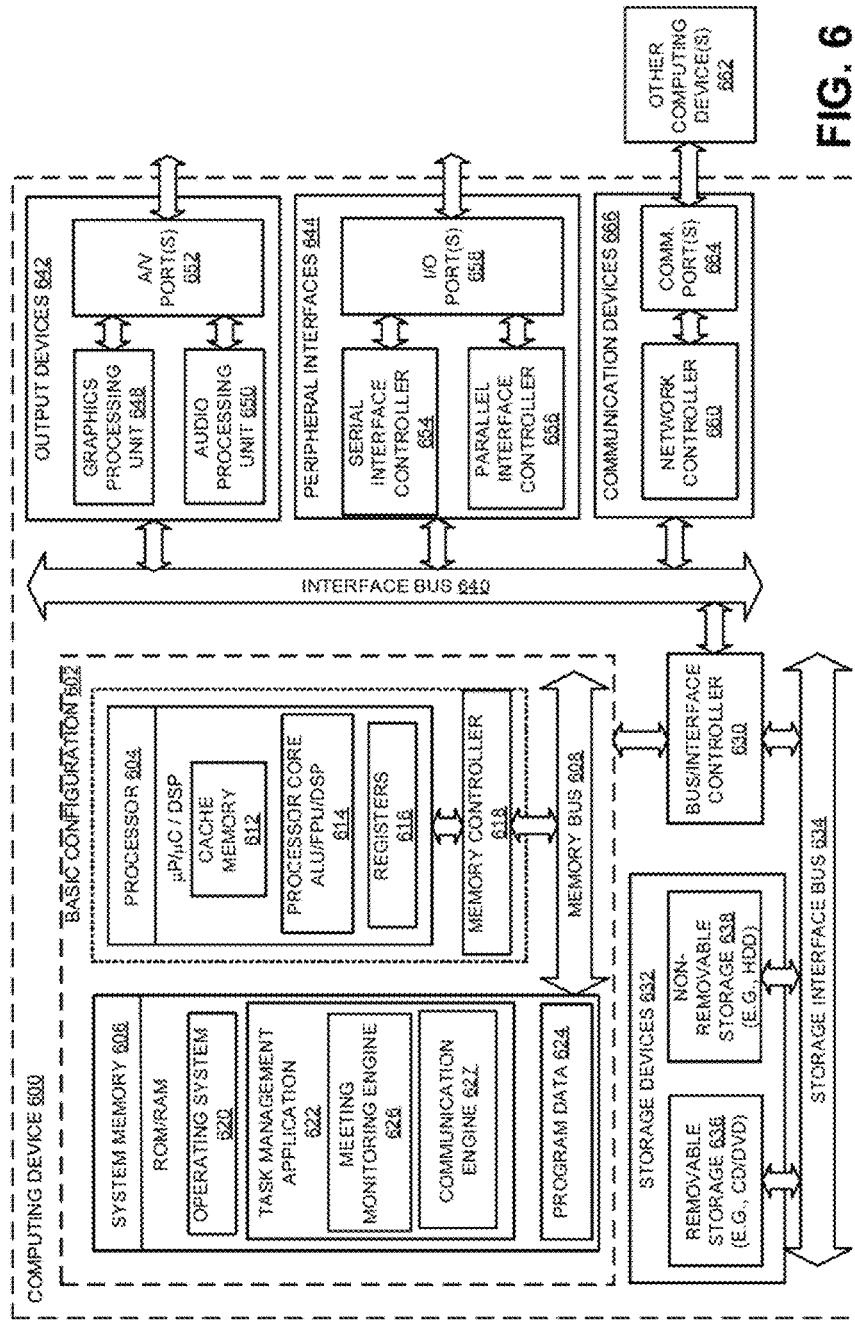
FIG. 6 is a block diagram of an example computing environment for providing conference call aid based on upcoming deadlines, where embodiments may be implemented.

FIG. 6 is a block diagram of an example computing environment for providing conference call aid based on upcoming deadlines, where embodiments may be implemented.

For example, a computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a task management application 622, and a program data 624. The task management application 622 may include a meeting monitoring engine 626 and a communication engine 627.

The meeting monitoring engine 626 may detect an expiration of a join duration from a start time of a meeting and may identify a late invitee to the meeting. The meeting monitoring engine 626 may detect a communication modality to communicate with the late invitee. In other examples, the meeting monitoring engine 626 may detect attributes associated with one or more meeting invitees. The attributes may include a participation history and/or an organizational relationship, among others. In some examples, the meeting monitoring engine 626 may determine a participation likelihood of the meeting invitees based on the attributes and may identify the late invitee from the meeting invitees based on the participation likelihood.

The communication engine 627 may establish a communication with the late invitee based on the communication modality. The communication engine 627 may also transmit a notification to join the meeting to the late invitee. The notification may prompt the late invitee to join the meeting through the communication. In other examples, the communication engine 627 may distinguish the attendee from the late invitee with a textual scheme, a graphical scheme, an audio scheme, an animation scheme, a coloring scheme, a highlighting scheme, and/or a shading scheme, among others.

A networking device of the computing device 600 may provide communication between the task management application 622, other applications(s), other device(s), and/or other entities, among others. Components of the task management application 622 (such as the task management UI) may also be displayed on the display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming the task management interface of the task management application 622, displayed by the touch based device. The program data 624 may also include, among other data, communication data and information related to the communications, or the like, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the example basic configuration 602 via the bus/interface controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods for providing a conference call aid based on an upcoming deadline. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
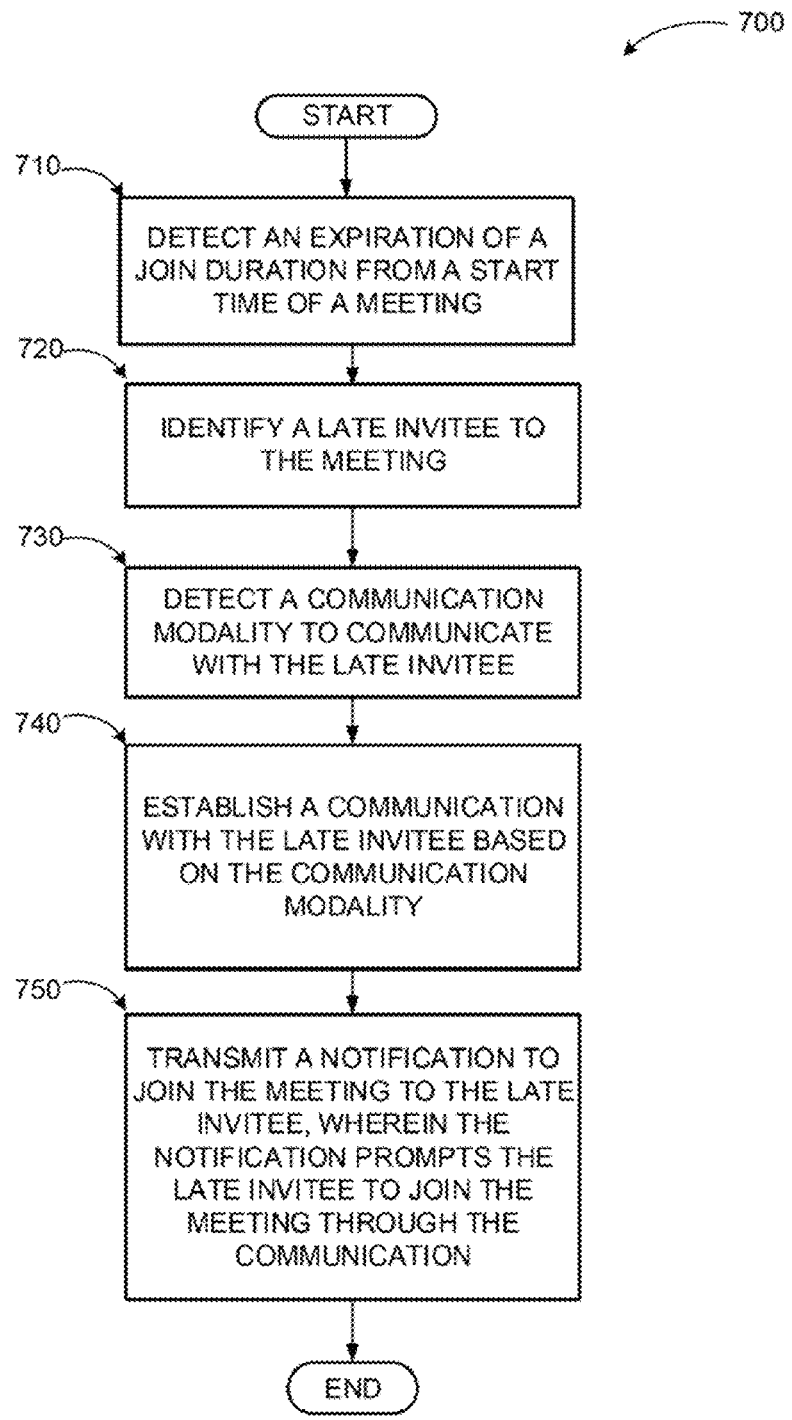
FIG. 7 illustrates a logic flow diagram for providing conference call aid based on upcoming deadlines, according to embodiments.

FIG. 7 illustrates a logic flow diagram for providing conference call aid based on upcoming deadlines, according to embodiments.

A process 700 may be implemented on a computing device, such as the computing device 600, or with another system. As described, meeting invitees may be allowed to interact with a task management application through an input device or a touch enabled display component of the computing device 600. The computing device 600 may provide a task management interface of the task management application to the meeting invitees.

The process 700 begins with operation 710, where the task management application may detect an expiration of a join duration from a start time of a meeting. At operation 720, the task management application may identify a late invitee to the meeting. At operation 730, the task management application may detect a communication modality to communicate with the late invitee.

At operation 740, the task management application may establish a communication with the late invitee based on the communication modality. The communication may include an audio communication, a video communication, an instant messaging communication, a communication to share data, and/or an application sharing communication, among others. At operation 750, the task management application may transmit a notification to join the meeting to the late invitee. The notification may prompt the late invitee to join the meeting through the communication.

The operations included in process 700 are for illustration purposes. Providing conference call aid based on upcoming deadlines may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

A means for providing a conference call aid based on an upcoming deadline may be provided, which includes a means for detecting an expiration of a join duration from a start time of a meeting, a means for identifying a late invitee to the meeting, a means for detecting a communication modality to communicate with the late invitee, a means for establishing a communication with the late invitee based on the communication modality, and a means for transmitting a notification to join the meeting to the late invitee. The notification prompts the late invitee to join the meeting through the communication.

According to some embodiments, computing devices for providing a conference call aid based on an upcoming deadline are described. An example computing device may include a networking device, a memory, and processors coupled to the memory and the networking device. The processors may execute a task management application in conjunction with instructions stored in the memory. The task management application may include a meeting monitoring engine and a communication engine. The meeting monitoring engine may detect an expiration of a join duration from a start time of a meeting, identify a late invitee to the meeting, and detect a communication modality to communicate with the late invitee. The communication engine may establish a communication with the late invitee based on the communication modality. The communication engine may also transmit, through the networking device, a notification to join the meeting to the late invitee. The notification prompts the late invitee to join the meeting through the communication.

According to other embodiments, the meeting monitoring engine may be further configured to detect attributes associated with meeting invitees, determine a participation likelihood of the meeting invitees based on the attributes and identify the late invitee from the meeting invitees based on the participation likelihood. The attributes may include a participation history and/or an organizational relationship, among others.

According to some embodiments, the meeting monitoring engine may be further configured to identify a behavioral relationship between meeting invitees and a meeting presenter, determine a participation likelihood of the meeting invitees based on the behavioral relationship, and identify the late invitee from the meeting invitees based on the participation likelihood. The behavioral relationship may include a frequency of previous communications between the meeting invitees and/or the meeting presenter and a status of the communication modality, among others. The status of the communication modality may include a muting status of a microphone, a muting status of a speaker, an on status of a camera, a movement detected in front of the camera, an action to share a presentation, and/or an annotation on a whiteboard associated with the late invitee, among others.

According to further embodiments, the meeting monitoring engine may be configured to determine a status associated with the communication modality and in response to a detection of the status as inactive, notify a meeting presenter of the late invitee. In other examples, the meeting monitoring engine may be further configured to verify a status of the communication modality as active.

According to some embodiments, the meeting monitoring engine may be further configured to identify meeting invitees with an active communication associated with the meeting as attendees and provide status information associated with the meeting attendees and the late invitee for a presentation on a task management interface. In some examples, the communication engine may be further configured to distinguish the attendees from the late invitee within the status information with a textual scheme, a graphical scheme, an audio scheme, an animation scheme, a coloring scheme, a highlighting scheme, and/or a shading scheme, among others. In some other examples, the meeting monitoring engine may be further configured to initiate a countdown of the join duration at the start time of the meeting.

According to some embodiments, methods executed on computing devices for providing a conference call aid based on an upcoming deadline, may be provided. An example method may include process steps, such as, detecting an expiration of a join duration from a start time of a meeting, identifying a late invitee to the meeting, detecting a communication modality to communicate with the late invitee, establishing a communication with the late invitee based on the communication modality, and transmitting a notification to join the meeting to the late invitee. The notification prompts the late invitee to join the meeting through the communication.

In some embodiments, the method may include further process steps for detecting an optional categorization of the meeting and disconnecting the communication with the late invitee based on the optional categorization. In some examples, the method may include further process steps for identifying a mandatory attendee status associated with the late invitee, detecting a failure to attend the meeting by the late invitee after an expiration of an extended join duration, and canceling the meeting.

In other embodiments, the method may include further process steps for identifying a supervisory role associated with the late invitee and generating a lock on the meeting to prevent a sharing of files and slides between meeting attendees. In other examples, the method may further include process steps for detecting the late invitee joining the meeting and releasing the lock from the meeting.

In additional embodiments, the method may include further process steps for identifying the meeting categorized as optional, detecting a request to categorize the meeting as mandatory, and modifying the meeting from optional to mandatory. In other examples, the method may further include process steps for detecting a failure to attend the meeting by the late invitee after an expiration of an extended join duration and canceling the meeting.

According to some examples, computer-readable memory devices with instructions stored thereon for providing a conference call aid based on an upcoming deadline may be provided. An example computer-readable memory device with instructions stored thereon for providing a conference call aid based on an upcoming deadline may include detecting an expiration of a join duration from a start time of a meeting, identifying a late invitee to the meeting, detecting a communication modality to communicate with the late invitee, establishing a communication with the late invitee based on the communication modality, and transmitting a notification to join the meeting to the late invitee. The notification prompts the late invitee to join the meeting through the communication.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing a conference call aid based on an upcoming deadline, the computing device comprising:
    a networking device;
    a memory; and
    one or more processors coupled to the memory and the networking device, the one or more processors executing a task management application in conjunction with instructions stored in the memory, wherein the task management application includes:
        a meeting monitoring engine configured to:
            identify a late invitee to a meeting;
            identify a supervisory role associated with the late invitee:
            generate a lock on the meeting to prevent a sharing of files and slides between meeting attendees; and
            detect a communication modality to communicate with the late invitee; and
        a communication engine configured to:
            establish a communication with the late invitee through a communication application executed on the computing device associated with the late invitee based on the communication modality;
            transmit, through the networking device, a notification to join the meeting to the computing device associated with the late invitee, wherein the notification prompts the communication application to display a message to the late invitee to join the meeting through the established communication; and
            upon detecting the late invitee joining the meeting through the communication application, release the lock from the meeting.

2. The computing device of claim 1, wherein the meeting monitoring engine is further configured to:
    detect attributes associated with one or more meeting invitees, wherein the attributes include one or more of a participation history and an organizational relationship;
    determine a participation likelihood of the one or more meeting invitees based on the attributes; and
    identify the late invitee from the one or more meeting invitees based on the participation likelihood.

3. The computing device of claim 1, wherein the meeting monitoring engine is further configured to:
    identify a behavioral relationship between one or more meeting invitees and a meeting presenter, wherein the behavioral relationship includes a frequency of one or more previous communications between the one or more meeting invitees and the meeting presenter and a status of the communication modality;
    determine a participation likelihood of the one or more meeting invitees based on the behavioral relationship; and
    identify the late invitee from the one or more meeting invitees based on the participation likelihood.

4. The computing device of claim 3, wherein the status of the communication modality includes one or more of a muting status of a microphone, a muting status of a speaker, an on status of a camera, a movement detected in front of the camera, an action to share a presentation, and an annotation on a whiteboard associated with the late invitee.

5. The computing device of claim 1, wherein the meeting monitoring engine is further configured to:
determine a status associated with the communication modality; and
in response to a detection of the status as inactive, notify a meeting presenter of the late invitee.

6. The computing device of claim 1, wherein the meeting monitoring engine is further configured to:
verify a status of the communication modality as active.

7. The computing device of claim 1, wherein the meeting monitoring engine is further configured to:
identify one or more meeting invitees with an active communication associated with the meeting as one or more attendees; and
provide status information associated with the one or more meeting attendees and the late invitee for a presentation on a task management interface.

8. The computing device of claim 7, wherein the communication engine is further configured to:
distinguish the one or more attendees from the late invitee within the status information with one or more of a textual scheme, a graphical scheme, an audio scheme, an animation scheme, a coloring scheme, a highlighting scheme, and a shading scheme.

9. The computing device of claim 1, wherein the meeting monitoring engine is further configured to:
initiate a countdown of a join duration at a start time of the meeting.

10. A method executed on a computing device for providing a conference call aid based on an upcoming deadline, the method comprising:
determining, by the task management application of the computing device, a participation likelihood of one or more meeting invitees based on attributes, wherein the attributes include one or more of: a participation history and an organizational relationship;
identifying, by the task management application of the computing device, a late invitee to a meeting based on the participation likelihood;
detecting, by the task management application of the computing device, a communication modality to communicate with the late invitee;
establishing, by a communication application of the computing device, a communication with the late invitee based on the communication modality; and
transmitting, through a networking device, a notification to join the meeting to the computing device associated with the late invitee, wherein the notification prompts the communication application to display a message to the late invitee to join the meeting through the established communication.

11. The method of claim 10, further comprising:
detecting an optional categorization of the meeting; and
disconnecting the communication with the late invitee based on the optional categorization.

12. The method of claim 10, further comprising:
identifying a mandatory attendee status associated with the late invitee;
detecting a failure to attend the meeting by the late invitee after an expiration of an extended join duration; and
canceling the meeting.

13. The method of claim 10, further comprising:
identifying a supervisory role associated with the late invitee; and
generating a lock on the meeting to prevent a sharing of files and slides between meeting attendees.

14. The method of claim 13, further comprising:
detecting the late invitee joining the meeting; and
releasing the lock from the meeting.

15. The method of claim 10, further comprising:
identifying the meeting categorized as optional;
detecting a request to categorize the meeting as mandatory; and
modifying the meeting from optional to mandatory.

16. The method of claim 15, further composing:
detecting a failure to attend the meeting by the late invitee after an expiration of an extended join duration; and
canceling the meeting.

17. A hardware computer-readable memory device with instructions stored thereon for providing a conference call aid based on an upcoming deadline, the instructions comprising:
determining a participation likelihood of one or more meeting invitees based on attributes, wherein the attributes include one or more of: a participation history and an organizational relationship;
identifying a late invitee to a meeting based on the participation likelihood;
detecting a communication modality to communicate with the late invitee;
establishing, by a communication application of a computing device, a communication with the late invitee based on the communication modality; and
transmitting, through a networking device, a notification to join the meeting to the computing device associated with the late invitee, wherein the notification prompts the communication application to display a message to the late invitee to join the meeting through the established communication.

18. The hardware computer-readable memory device of claim 17, wherein the instructions further comprise:
identifying a mandatory attendee status associated with the late invitee;
detecting a failure to attend the meeting by the late invitee after an expiration of an extended join duration; and
canceling the meeting.

19. The hardware computer-readable memory device of claim 17, wherein the instructions further comprise:
identifying a supervisory role associated with the late invitee; and
generating a lock on the meeting to prevent a sharing of files and slides between meeting attendees.

20. The hardware computer-readable memory device implemented of claim 19, wherein the instructions further comprise:
detecting the late invitee joining the meeting; and
releasing the lock from the meeting.

* * * * *